United States Patent
Gretz

(10) Patent No.: US 10,920,910 B1
(45) Date of Patent: Feb. 16, 2021

(54) STACKABLE CABLE HANGER WITH LATCHING FEATURE

(71) Applicant: Arlington Industries, Inc., Scranton, PA (US)

(72) Inventor: Thomas J. Gretz, Delray Beach, FL (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 17/065,073

(22) Filed: Oct. 7, 2020

Related U.S. Application Data

(60) Provisional application No. 62/912,101, filed on Oct. 8, 2019.

(51) Int. Cl.
| | | |
|---|---|---|
| *F16L 3/10* | (2006.01) | |
| *F16L 3/24* | (2006.01) | |
| *F16L 3/23* | (2006.01) | |

(52) U.S. Cl.
CPC ............ *F16L 3/105* (2013.01); *F16L 3/1041* (2013.01); *F16L 3/1058* (2013.01); *F16L 3/23* (2013.01); *F16L 3/24* (2013.01)

(58) Field of Classification Search
CPC . F16L 3/105; F16L 3/1041; F16L 3/23; F16L 3/1058; F16L 3/24
USPC .......................................... 248/68.1, 49–74.5
See application file for complete search history.

(56) References Cited

U.S. PATENT DOCUMENTS

| | | | | |
|---|---|---|---|---|
| 3,615,003 | A  * | 10/1971 | Rust ...................... | B65G 17/20 198/687.1 |
| 4,702,175 | A  * | 10/1987 | Brudereck .............. | B66C 13/12 105/154 |
| 5,740,994 | A  * | 4/1998 | Laughlin .................. | F16L 3/23 248/58 |
| 5,961,081 | A | 10/1999 | Rinderer | |
| 6,565,048 | B1 | 5/2003 | Meyer | |
| 7,407,138 | B1 * | 8/2008 | Gretz ........................ | F16L 3/02 248/304 |
| 8,322,662 | B2 | 12/2012 | Heath et al. | |
| 8,840,071 | B2 * | 9/2014 | Oh .......................... | F16L 3/221 248/68.1 |
| 9,115,827 | B2 | 8/2015 | Heath et al. | |
| 9,506,582 | B2 * | 11/2016 | Anderson ................. | F16L 3/13 |
| 9,604,824 | B2 * | 3/2017 | McKay .................... | H02G 7/08 |

* cited by examiner

*Primary Examiner* — Muhammad Ijaz

(57) ABSTRACT

A stackable cable hanger for supporting bundles of communications cables with the center radius of the bundle spread over the opening of the cable hanger. The cable hanger includes a cable tray with an upward extending inner arm and an upward extending outer arm. A cable tray extends between the arms. An arcuate surface on the cable tray provides a gentle bend radius to any cable bundles laid on the tray. Arcuate transitions on lateral ends of the cable tray provide a curved transition between the tray and the arms. Mounting holes are on the top and bottom of the inner arm enable attachment of the hanger to a support surface and vertical stacking of multiple hangers to create multiple tiers of cable bundles. A tie down loop on the inner arm and on the outer arm enables closure of the hanger opening with a cable tie or similar closure device.

13 Claims, 8 Drawing Sheets

STACKABLE CABLE HANGER WITH LATCHING FEATURE

This application claims the priority of Provisional U.S. Patent Application Ser. No. 62/912,101 filed Oct. 8, 2019, the entire contents of which are incorporated herein by reference.

FIELD OF THE INVENTION

This invention relates to cable supports for communications cables rated for high data transmission rates and specifically to a cable support with improved stiffness, an improved cable retaining arrangement, and the capability of being ganged together with additional like cable supports for supporting several bundles of cable.

BACKGROUND OF THE INVENTION

Many LANs today use Cat 5 or 5e cable, the performance requirements of which are defined by the Electronic Industries Association (EIA) standard TSB-36 for UTP cable. These unshielded twisted pair cables have been developed to meet the high data transmission speeds needed in modern Local Area Networks (LAN). Cat 5 or 5e cables are typically routed throughout new or existing buildings. Great care is necessary when running UTP cable, as any kinking, sharp bends, excessive sag between supports can damage the cable and cause undesirable side effects, such as creation of cross-talk or static between the various conductors or loss of data transmission rate and quality in the network.

Although various J-hooks have been proposed for the support of Cat 5 or 5e cables, many are either limited in the amount of weight they can support, in the number of cables that can be supported, or in the types of support to which they can be connected.

Accordingly, what is needed is a cable support for Cat 5 or 5e cables that includes a 25 lb. support rating and listed for use in air handling spaces per NEC 300.22(c), maintains the integrity of high performance data cable, are easily attached to various supports, beam clamps, and struts, that are usable on large panels to ensure proper bend radius, and are constructed of a material specifically listed for use within an air handling space, which provide a broad tray for cable support, reducing stress and bending, and are stackable to support multiple vertical tiers of cable.

OBJECTS OF THE INVENTION

One object of the invention is to provide a convenient solution for running communications cable.

Another object of the invention is to provide a cable support that is capable of being used in air handling spaces per NEC 300.22(c).

A further object is to provide a cable-holding device that support that supports up to 90 Cat 5e cables with the center radius of the bundle spread over the wide cable tray.

Another object of the invention is to provide a cable support that is stackable, in parallel or perpendicular orientation, for vertical support of multiple tiers of cable.

A further object of the invention is to provide a cable support that maintains the integrity of high performance data cable.

Yet another object of the invention is to provide a cable support that is easy to attach to various supports, including beam clamps and struts, and is usable on large panels to ensure proper bend radius.

These and other advantages will become obvious by reading the attached detailed description of the present invention along with reference to the drawings and the appended claims.

BRIEF SUMMARY OF THE INVENTION

The invention is a stackable cable hanger for supporting bundles of communications cables with the center radius of the bundle spread over the opening of the cable hanger. The cable hanger includes a cable tray with an upward extending inner arm and an upward extending outer arm. A cable tray extends between the inner arm and outer arm at their wider lower ends. The cable tray includes an arcuate surface. Arcuate transitions are provided at both ends of the cable tray to provide a curved transition between the tray and the inner arm and the tray and the outer arm. Mounting holes are provided on the top and bottom of the inner arm to enable securing the hanger to a support surface and to enable vertical stacking of multiple hangers to create multiple tiers of cable bundles. A tie down loop on the inner arm and on the outer arm enables closure of the hanger opening with a cable tie or similar closure device.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION OF THE INVENTION

Figure 5:
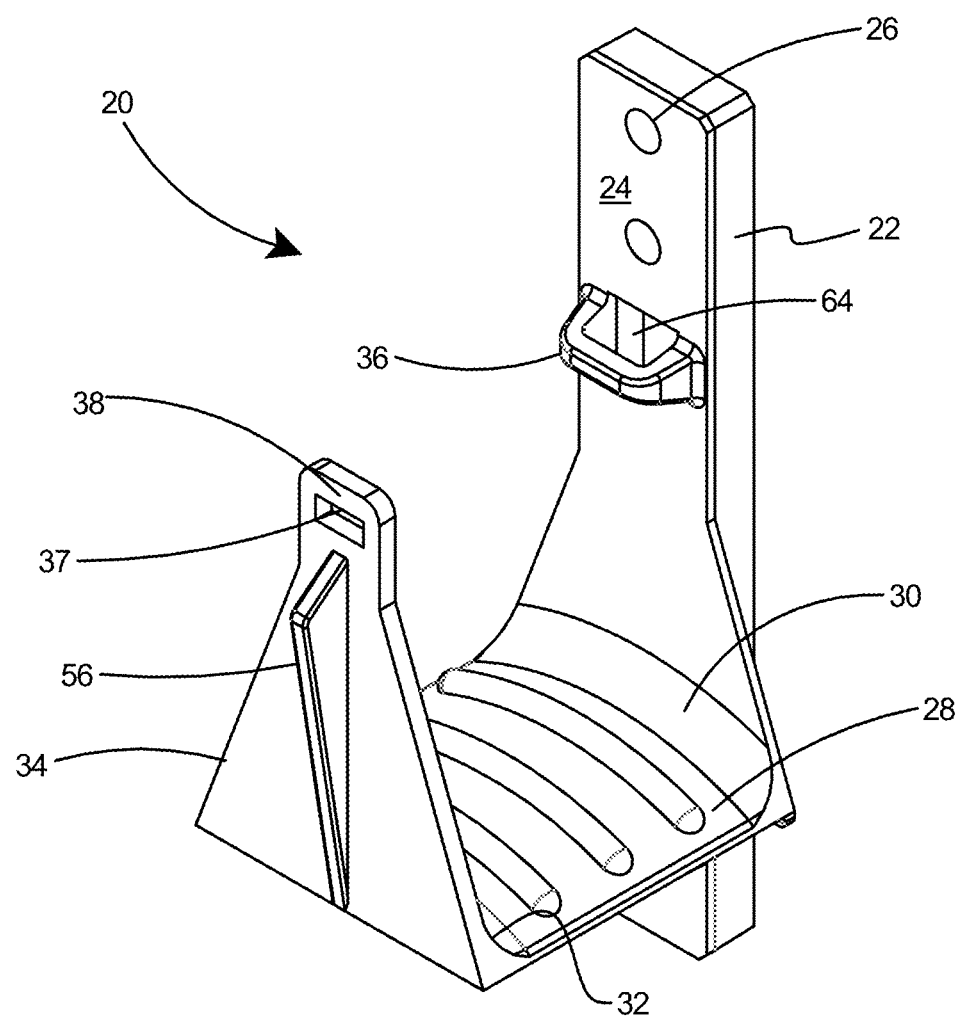
FIG. 5 is a front isometric view of the cable support.
Figure 6:
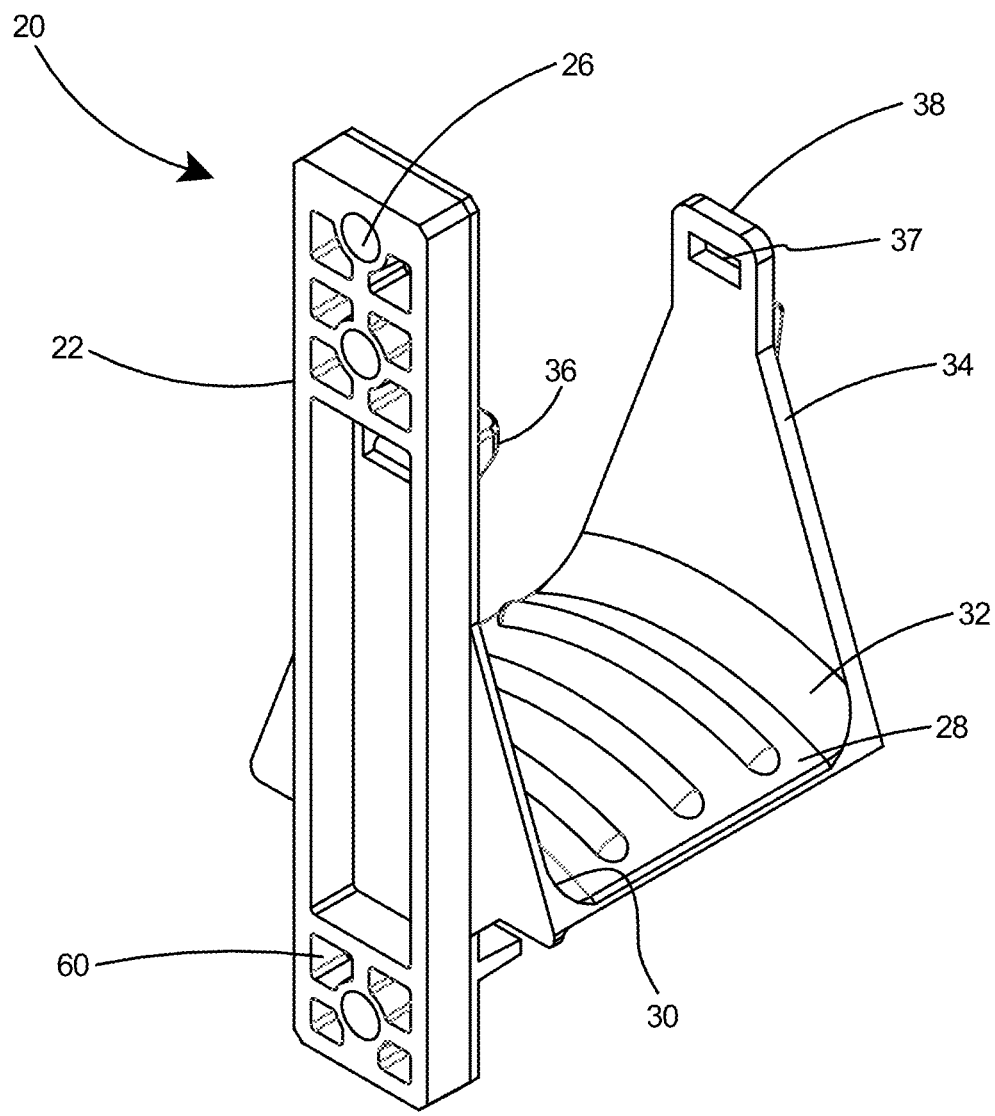
FIG. 6 is a rear isometric view of the cable support.

With reference to FIG. 5, the present invention is a cable support 20 for communications cable according to the invention. The cable support 20 includes an inner arm 22 having a front surface 24 and one or more mounting holes 26 in the inner arm. A cable tray 28 with an opening extends from the inner arm 22. A first arcuate transition surface 30 is included on the cable tray 28 between the cable tray 28 and front surface 24 of the inner arm 22 and a second arcuate transition surface 32 is included on the cable tray between the cable tray and an outer arm 34. A tie down loop 36 extends from the front surface 24 of the inner arm 22. Outer arm 34 includes a tie down loop 38 and an aperture 37 adjacent the distal end 39 of the outer arm. To operate the invention, the cable support 20 is typically mounted to an overhead structure using a beam clamp, strut, or similar device by screws (not shown) through the mounting holes 26. The arcuate transitions 30 and 32 ensure that any cables laid on the cable tray will not be forced into a tight or narrow corner and kinked or bent by the weight of the bundle of cables laid therein.

Figure 1:
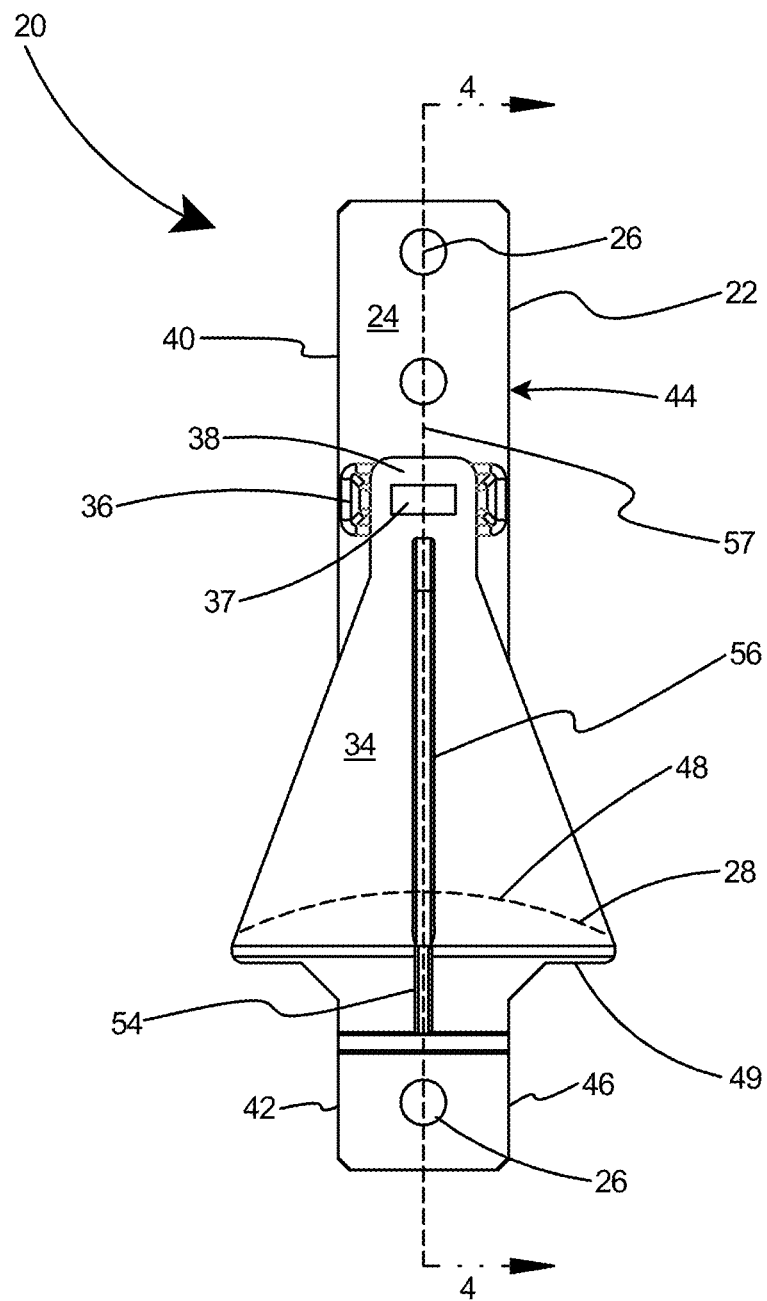
FIG. 1 is a front elevation view of a cable support in accordance with embodiments of the invention.

Referring to FIG. 1, cable support 20 is typically mounted to the wall in the orientation shown, with the cable support including a top portion 40 and a bottom portion 42. Most preferably mounting holes 26 are included on both the top 40 and bottom portions 42 of the inner arm 22. The top portion 40 of the inner arm 22 preferably includes edges 44 that are substantially parallel with the edges 46 on the bottom portion 42. Outer arm 34 is preferably wider at the bottom than the top. Cable tray 28 includes a convex arcuate surface 48 as indicated by the dashed line in FIG. 1. The lateral arcuate transitions 30 and 32 provide a smoothly curved surface laterally across the cable tray 28 but are also curved longitudinally across the cable tray at the same curvature as the arcuate surface 48 of the cable tray 28. Both arms 22 and 34 include substantially equal triangular wings 47, with the lower end 49 of the cable tray 28 being a base of the triangle and wider than the upper end. Such a profile provides a wide surface for supporting cables therein.

Figure 2:
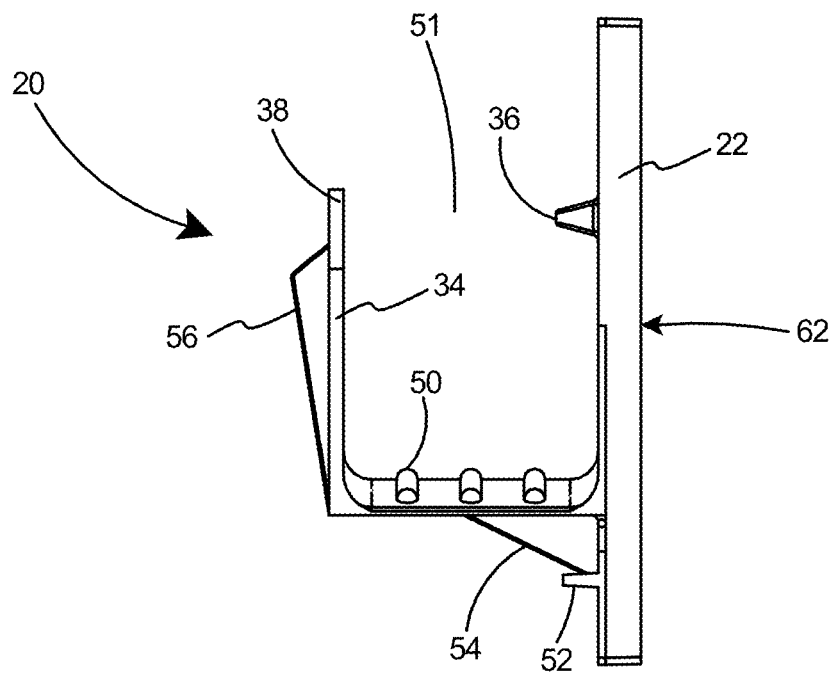
FIG. 2 is a side view of the cable support.
Figure 3:
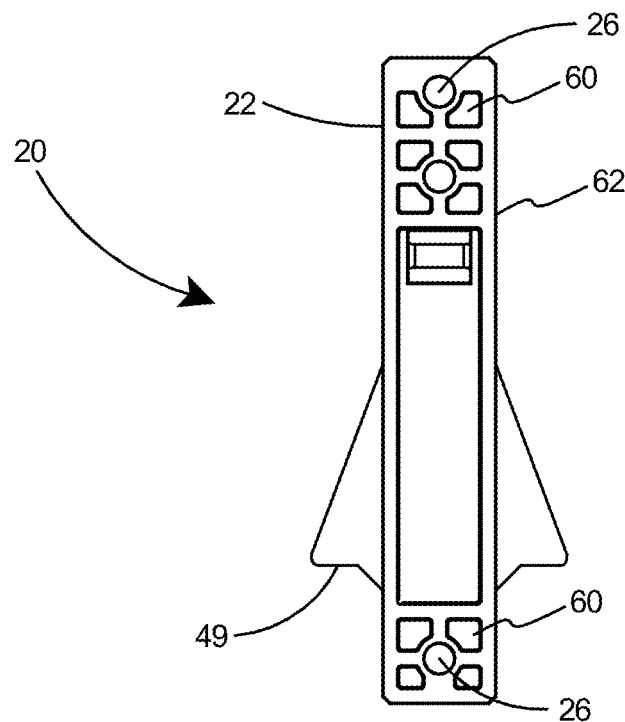
FIG. 3 is a rear elevation view of the cable support.

With reference to FIG. 2, one or more ridges 50 are spaced laterally across the top surface of the cable tray. The term "lateral" as used herein refers to the direction across which the cables will be laid and the term "longitudinal" as used herein refers to the direction along which the cables will extend lengthwise. The cable support includes an opening 51 between the arms 22 and 34. A tab 52 and an inner buttress 54 support the cable tray 28 with an outer buttress 56 supporting and stiffening the outer arm 34. The ridges 50 on the top surface of the cable tray 28 provide a means for separating individual cables to the greatest extent possible and to inhibit their shifting within the support. One or more recesses 60, which serve as material savers, may be provided in the back surface 62 of the inner arm 22. As shown in FIG. 1, the inner buttress 54 on the inner arm 22 and the outer buttress 56 on the outer arm 34 reside in the same plane 57, the plane along the vertical sectional line.

Figure 4:
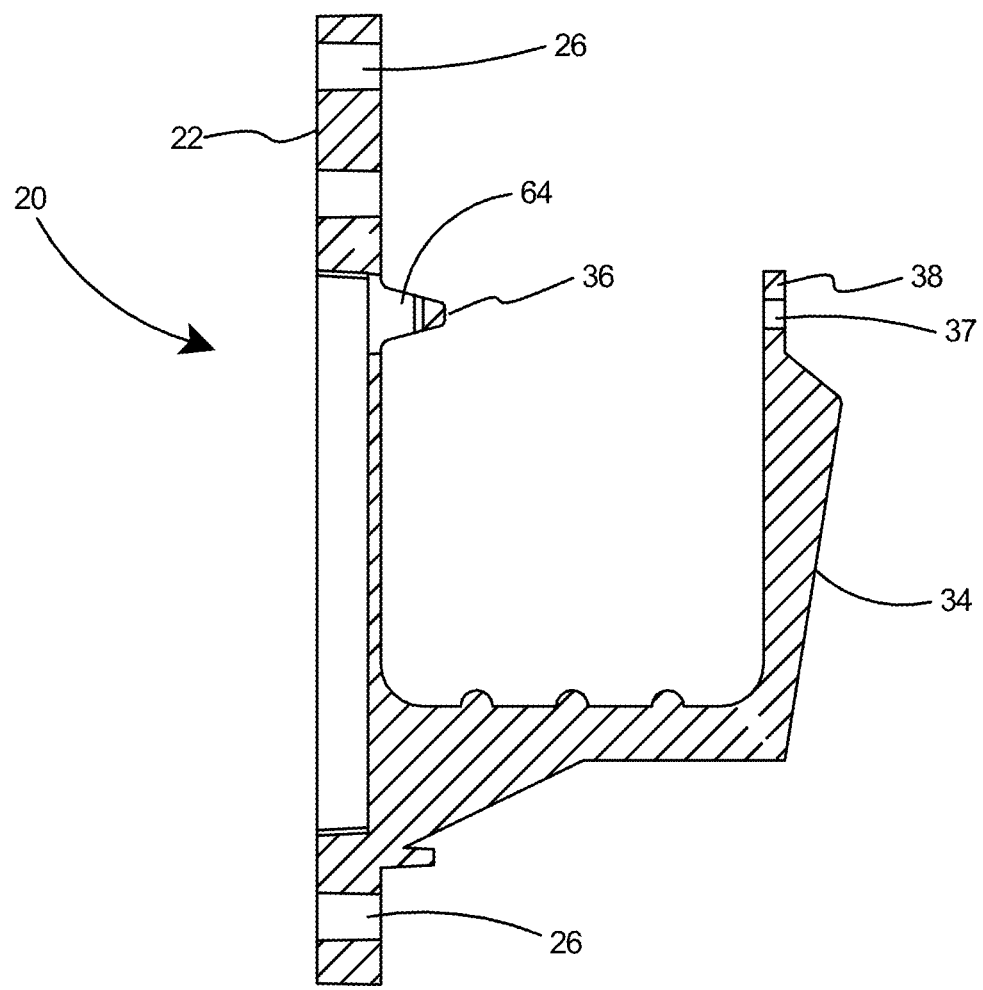
FIG. 4 is a sectional view of the cable support taken along line 4-4 of FIG. 1.

Referring to FIG. 4, the tie down loop 36 includes an aperture 64 that is offset from the inner arm 22 and outer arm 34 includes an aperture 37 therein. After the cable support 20 is secured to a wall and cables (not shown) are laid within the support onto the cable tray 28, a cable tie or similar fastening device (not shown) may be inserted across the across the cable tray and through the apertures 64 and 37 and around the tie down loops 36 and 38 in the inner arm 22 and outer arm 34 respectively in order to secure the cables within the tray.

Figure 7:
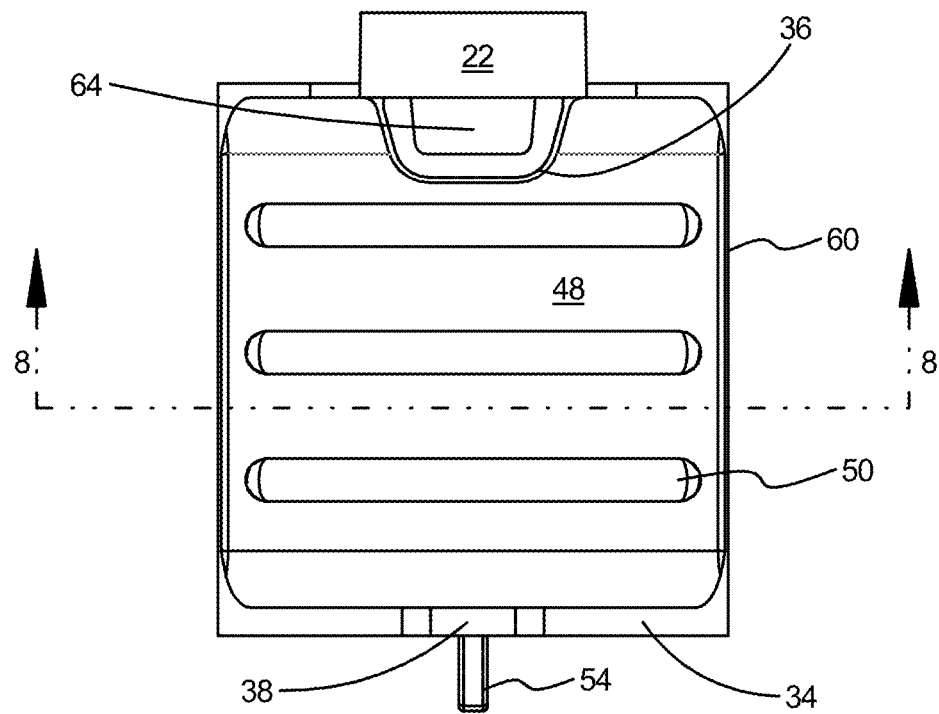
FIG. 7 is a top view of the cable support.
Figure 8:
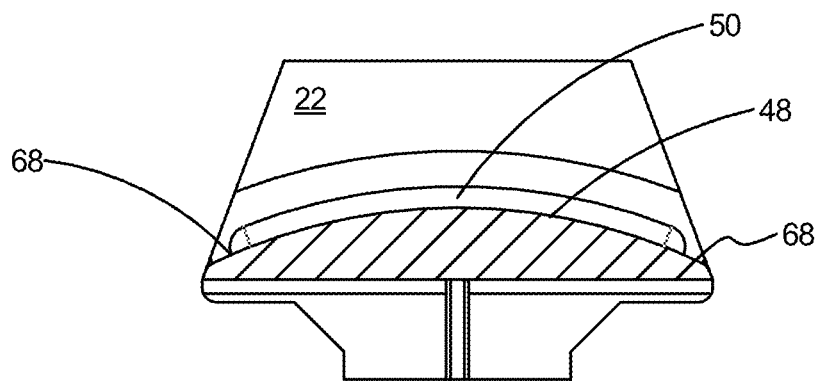
FIG. 8 is a sectional view of the cable support taken along line 7-7 of FIG. 7.

With reference to FIGS. 7 and 8, the cable tray 28 includes two open sides 68 and the ridges 50 on the arcuate surface 48 of the cable tray 28. The arcuate surface 48 provides a curved surface over which the cabling is laid to insure an entirely smooth transition across the support.

Figure 9:
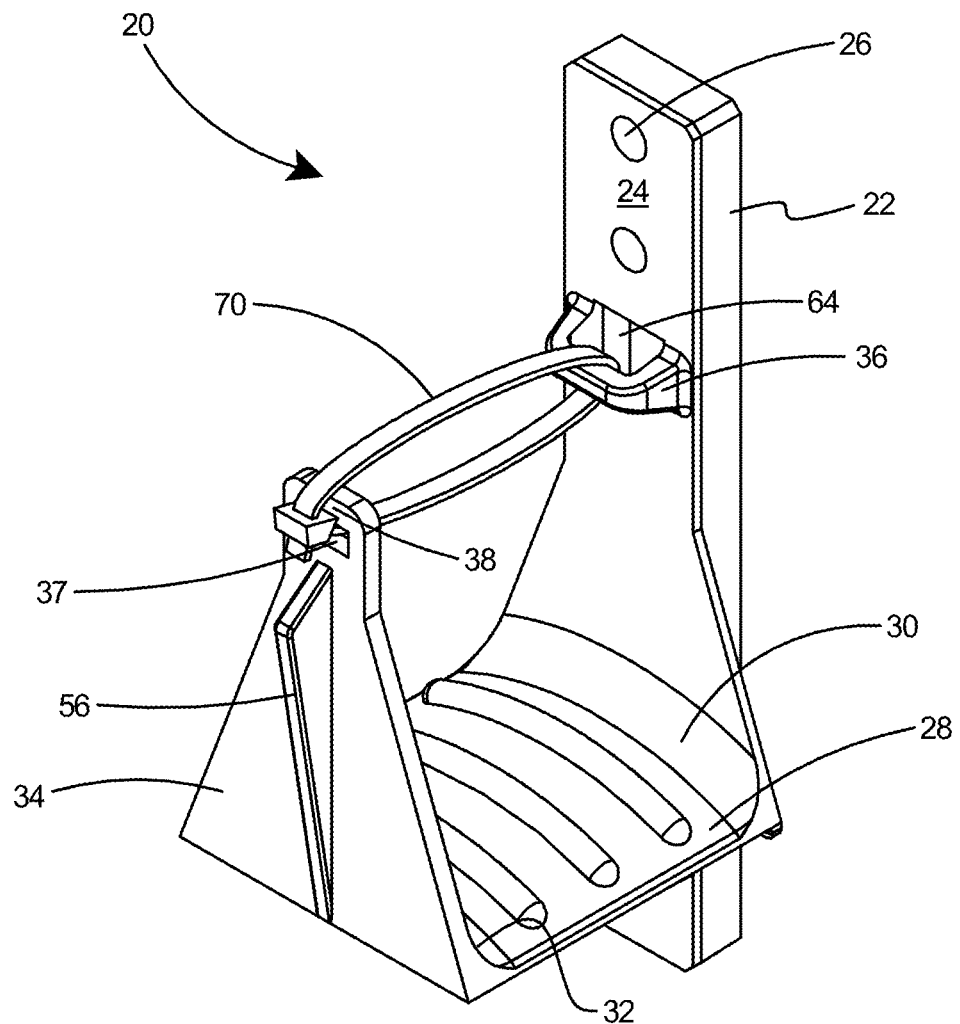
FIG. 9 is a front isometric view of the cable support including a latching device.

Referring to FIG. 9, after loading cables (no shown) onto the cable tray 28, a latching member 70, such as a cable tie, may be passed through tie down loops 36 and 38 to secure the cables therein.

Figure 10:
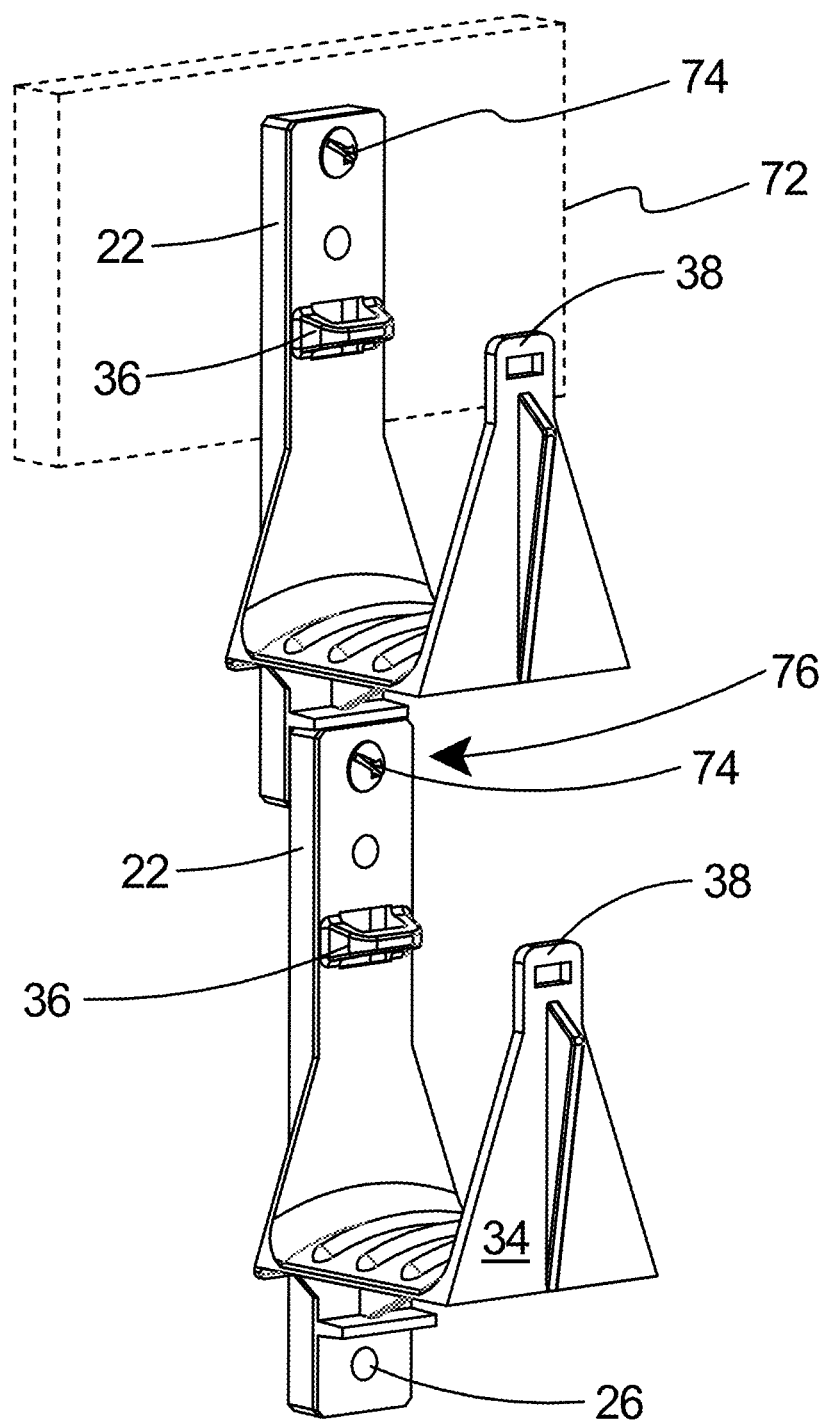
FIG. 10 is an isometric view depicting two cable supports ganged together vertically to support multiple bundles of cables.

With reference FIG. 10, multiple cable supports may be stacked vertically to support multiple bundles of cables. A topmost cable support 20 is secured to a support 72 by a fastener 74 through the mounting hole 26 in the inner arm 22 and one or more additional cable supports are secured by fasteners 74 passing through the inner arm 22 of the lower cable support and into the aperture in the outer arm 34. The mounting holes 26 on the inner arm 22 and a fastener 74 form a means for stacking and securing 76 one or more cable supports together.

The present invention describes an improved plastic communications cable support which provides a curved surface over which the cabling is laid to insure an entirely smooth transition across the support as well as incorporating an integral pliable member for securing and locking the support after cable installation. Additionally, an arrangement is provided which may permit separation of individual cables and to inhibit their shifting within the support.

The cable support 20 may be constructed of metal or plastic. Most preferably, the cable support 20 is molded in one piece of nylon, polycarbonate, or polyvinyl chloride (PVC).

While the invention has been described in terms of various specific embodiments, those skilled in the art will recognize that the invention can be practiced with modification within the spirit and scope of the claims.

What is claimed is:

1. A cable support comprising:
   a cable tray including an opening;
   an inner arm extending upward from the cable tray;
   an outer arm extending upward from the cable tray;
   a tie down loop on said inner arm and on said outer arm;
   triangular wings on said inner and outer arms, said triangular wings having a respective lower end; and
   the lower ends of the triangular wings forming a base of a triangle to provide a wide surface on the cable tray.

2. The cable support of claim 1 comprising a lateral extent and a longitudinal extent across said cable tray.

3. The cable support of claim 2 comprising a convex arcuate surface across the longitudinal extent of said cable tray.

4. The cable support of claim 1 comprising mounting holes in said inner arm.

5. The cable support of claim 1 comprising one or more ridges spaced laterally across said cable tray.

6. The cable support of claim 1 comprising a latching member extending between the tie down loop.

7. The cable support of claim 6 comprising said latching member is a cable tie.

8. The cable support of claim 1 comprising a tab and an inner buttress on said inner arm, said tab and said inner buttress supporting the cable tray.

9. The cable support of claim 8 comprising an outer buttress on said outer arm.

10. The cable support of claim 9 comprising said inner buttress and said outer buttress reside in a same plane.

11. The cable support of claim 1 comprising a means of stacking two or more of said cable supports.

12. The cable support of claim 11 wherein said means of stacking two or more of said cable supports includes:
    a mounting hole in said inner arm; and
    a fastener for securing a first of said cable supports to a second of said cable supports.

13. The cable support of claim 1 comprising said cable support is molded in one-piece of plastic.

\* \* \* \* \*